United States Patent
Orr et al.

(10) Patent No.: US 12,260,028 B2
(45) Date of Patent: Mar. 25, 2025

(54) DATA INPUT SYSTEM WITH ONLINE LEARNING

(71) Applicant: Microsoft Technology Licensing, LLC, Redmond, WA (US)

(72) Inventors: Douglas Alexander Harper Orr, Brentwood (GB); Juha Iso-Sipila, London (GB); Marco Fiscato, London (GB); Matthew James Willson, London (GB); Joseph Osborne, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1069 days.

(21) Appl. No.: 15/475,038

(22) Filed: Mar. 30, 2017

(65) Prior Publication Data
US 2018/0150143 A1 May 31, 2018

(30) Foreign Application Priority Data

Nov. 29, 2016 (GB) ...................... 1620232

(51) Int. Cl.
*G06F 3/023* (2006.01)
*G06F 40/274* (2020.01)
(Continued)

(52) U.S. Cl.
CPC .......... *G06F 3/0237* (2013.01); *G06F 40/274* (2020.01); *G06N 3/04* (2013.01);
(Continued)

(58) Field of Classification Search
CPC ............ G06N 3/08; G06N 20/00; G06N 3/04; G06N 5/046; G06N 3/00; G06N 3/084;
(Continued)

(56) References Cited

U.S. PATENT DOCUMENTS 9,092,425 B2  7/2015  Mirowski et al.
9,153,231 B1  10/2015  Salvador et al.
(Continued)

FOREIGN PATENT DOCUMENTS

CA   2066159 C    2/1992
CN   106776534 A  5/2017
(Continued)

OTHER PUBLICATIONS

Kamvar et al., The Role of Context in Query Input: Using contextual signals to complete queries on mobile devices, Sep. 2007, MobileHCI '07 Proceedings of the 9th International conference on Human computer interaction with mobile devices and services, pp. 405-412 (Year: 2007).*

(Continued)

*Primary Examiner* — Van C Mang
*Assistant Examiner* — Charles C Kuo
(74) *Attorney, Agent, or Firm* — Schwegman Lundberg & Woessner, P.A.

(57) ABSTRACT

A data input system is described for inputting text items to an electronic device. The data input system has a store holding a vocabulary of embeddings of text items, each embedding being a numerical encoding of a text item. The data input system receives user input comprising a sequence of one or more context text items and a new text item, the new text item being a text item with an embedding to be computed and added to the vocabulary or with an embedding already in the vocabulary and to be updated. A neural network predictor predicts a next text item in the sequence given the context text items and the vocabulary. An online training module updates the vocabulary by using either a direction associated with the predicted next item, or, by comparing the new text item and the predicted next text item.

19 Claims, 10 Drawing Sheets

(51) Int. Cl.
*G06N 3/04* (2023.01)
*G06N 3/044* (2023.01)
*G06N 3/08* (2023.01)
*G06N 3/084* (2023.01)

(52) U.S. Cl.
CPC ............. *G06N 3/08* (2013.01); *G06N 3/084* (2013.01); *G06N 3/044* (2023.01)

(58) Field of Classification Search
CPC .... G06N 3/0454; G06N 20/10; G06N 3/0472; G06N 5/04; G06N 7/005; G06N 20/20; G06N 3/0445; G06N 3/0481; G06N 5/022; G06N 5/043; G06N 7/00; G06N 3/02; G06N 3/0418; G06N 3/063; G06N 3/082; G06N 3/088; G06N 3/123; G06N 5/003; G06N 5/045; G06N 5/047; G06N 3/006; G06N 3/0427; G06N 5/041; G06N 3/049; G06N 5/02; G06N 5/025; G06N 5/048; G06N 7/02; G06N 3/086; G06N 3/0436

See application file for complete search history.

(56) References Cited

U.S. PATENT DOCUMENTS

| | | | |
|---|---|---|---|
| 2003/0212663 | A1 | 11/2003 | Leno et al. |
| 2008/0243834 | A1 | 10/2008 | Rieman et al. |
| 2013/0018833 | A1 | 1/2013 | Sullivan et al. |
| 2014/0278379 | A1* | 9/2014 | Coccaro .............. G10L 15/1822 704/202 |
| 2015/0095017 | A1* | 4/2015 | Mnih .................... G06N 3/0454 704/9 |
| 2015/0220833 | A1 | 8/2015 | Le |
| 2015/0242087 | A1 | 8/2015 | Elangovan et al. |
| 2015/0309984 | A1 | 10/2015 | Bradford et al. |
| 2016/0247061 | A1 | 8/2016 | Trask et al. |

FOREIGN PATENT DOCUMENTS

| | | |
|---|---|---|
| EP | 2088536 A1 | 8/2009 |
| EP | 2638486 A1 | 9/2013 |

OTHER PUBLICATIONS

Math.com, Math Table: Vectors (https://web.archive.org/web/20150110012840/http://www.math.com/tables/oddsends/vectordefs.htm), accessed through Wayback Machine dated Jan. 10, 2015 (Year: 2015).*
Mikolov, Tomas et al., Distributed Representations of Words and Phrases and their Compositionality, 2013 (Year: 2013).*
Shokouhi, Milad, Learning to Personalize Query Auto-Completion, 2013, SIGIR'13, Jul. 28-Aug. 1, 2013, pp. 103-112 (Year: 2013).*
Barbieri, Francesco et al., What does this Emoji Mean? A Vector Space Skip-Gram Model for Twitter Emojis, 2016, pp. 3967-3972 (Year: 2016).*
Yin et al., Learning Word Meta-Embeddings, 2016, Proceedings of the 54th Annual Meeting of the Association for Computation Linguistics, pp. 1351-1360 (Year: 2016).*
Gomez-Adorno et al., Improving Feature Representation Based on a Neural Network for Author Profiling in Social Media Texts, 2016 (Year: 2016).*
Seah, Chun et al., Troll Detection by Doman-Adapting Sentiment Analysis, Jul. 2015 (Year: 2015).*
Pilehvar et al., From Senses to Texts: An All-In-One Graph-Based Approach for Measuring Semantic Similarity, Jul. 2015 (Year: 2015).*
Fiscato, et al., "Neural Language Modelling", Retrieved from: https://web.archive.org/web/20170917095927/http://www.bicv.org/?wpdmdl=2252, Sep. 29, 2016, 22 Pages.
Herbelot, et al., "High-risk learning: acquiring new word vectors from tiny data", Retrieved from: https://arxiv.org/abs/1707.06556, Jul. 20, 2017, 6 Pages.
Li, et al., "PSDVec: A tool box for incremental and scalable word embedding", arXiv:1606.03192v1 [cs.CL] Jun. 10, 2016, 12 Pages.
"International Search Report and Written Opinion Issued in PCT Application No. PCT/US17/062914", Mailed Date: Mar. 23, 2018, 10 Pages.
"Introducing the world's first neural network keyboard", https://blog.swiftkey.com/neural-networks-a-meaningful-leap-for-mobile-typing/, Published on: Oct. 8, 2015, 9 pages.
Ghoshal, Abhimanyu, "SwiftKey improves its Android keyboard predictions with neural networks", http://thenextweb.com/apps/2016/09/16/swiftkey-improves-its-android-keyboard-predictions-with-neural-networks/, Published on: Sep. 16, 2016, 7 pages.
"What is Backup & Sync?", http://web.archive.org/web/20150912083759/https://support.swiftkey.com/hc/en-us/articles/201448622-What-is-Backup-Sync-, Published on: Sep. 12, 2015, 3 pages.
"Vector Representations of Words", https://www.tensorflow.org/versions/r0.11/tutorials/word2vec/index.html, Retrieved on: Oct. 26, 2016, 12 pages.
"Recurrent Neural Networks with Word Embeddings", http://web.archive.org/web/20141115193806/http:/deeplearning.net/tutorial/rnnslu.html, Published on: Nov. 15, 2014, 6 pages.
"Office Action Issued in European Patent Application No. 17818361.2", Mailed Date: May 11, 2020, 6 Pages.
Brownlee, Jason, "How to Implement the Backpropagation Algorithm From Scratch in Python—Machine Learning Mastery", Retrieved from the Internet: <URL: https://web.archive.org/web/20170608055338/https://machinelearningmastery.com/implement-backpropagation-algorithm-scratch-python/>, Nov. 7, 2016, 47 Pages.
"Summons to Attend Oral Proceedings Issued in European Patent Application No. 17818361.2", Mailed Date : Feb. 4, 2021, 8 Pages.
Rei, Marek, "Online Representation Learning in Recurrent Neural Language Model,", In Proceedings of the Conference on Empirical Methods in Natural Language Processing, Sep. 17, 2015, pp. 238-243.
Souppouris, Aaron, "Swiftkey's Latest Keyboard is Powered by a Neural Network", Retrieved From : https://www.engadget.com/2015-10-08-swiftkey-neural-alpha.html, Oct. 8, 2015, 8 Pages.
"Office Action Issued in Indian Patent Application No. 201947020875", Mailed Date: Aug. 17, 2021, 7 Pages.
"Notice of Allowance Issued in Chinese Patent Application No. 201780073753.7", Mailed Date: Apr. 11, 2023, 4 Pages.
"Office Action and Search Report Issued in Chinese Patent Application No. 201780073753.7", Mailed Date: Sep. 20, 2022, 16 Pages.

* cited by examiner

P1 HE WAS PFLUNKED.

P2 ARE YOU PFLUNKED ?

P3 THE WHOLE JOB WAS PFLUNKED.

DATA INPUT SYSTEM WITH ONLINE LEARNING

CROSS-REFERENCE TO RELATED APPLICATION(S)

This non-provisional utility application claims priority to GB patent application number 1620232.7 entitled "DATA INPUT SYSTEM WITH ONLINE LEARNING" and filed on Nov. 29, 2016, which is incorporated herein in its entirety by reference.

BACKGROUND

Data input systems such as predictive keyboards aim to help users input data to electronic devices such as smart phones, wearable computers and other types of small form factor electronic device. Predictive keyboards typically present one or more candidate predicted words or phrases as options for the user to select and so enter into the electronic device.

Existing predictive keyboards that use neural network technology typically operate using a defined vocabulary which is typically specified by the manufacturer. It is difficult to personalize the vocabulary so that a user can more easily enter words that are often used by the user but which are not in the manufacturer's defined vocabulary. One approach to this problem has been to build an N-gram language model for a particular user by observing words entered by the particular user. This type of N-gram language model is not a neural network and so has various drawbacks, including that it has poor ability to generalize to situations where a user enters context words which have not been encountered before. Another approach is to try to re-train the whole neural network predictive keyboard itself using new words that the user enters to the electronic device. However, this is extremely time consuming and resource intensive and impractical to carry out on a resource constrained device during an online mode.

The embodiments described below are not limited to implementations which solve any or all of the disadvantages of known data input systems with online learning.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A data input system is described for inputting text items to an electronic device. The data input system has a store holding a vocabulary of embeddings of text items, each embedding being a numerical encoding of a text item. The data input system has a processor which receives user input comprising a sequence of one or more context text items and a new text item, the new text item being a text item with an embedding to be computed and added to the vocabulary or with an embedding already in the vocabulary and to be updated. A neural network predictor is trained to predict the new text item by predicting a next text item in the sequence given the context text items and the vocabulary. An online training module is configured to update the vocabulary by using either a direction associated with the predicted next item, or, by comparing the new text item and the predicted next text item and propagating results of the comparison to a final layer of the neural network.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
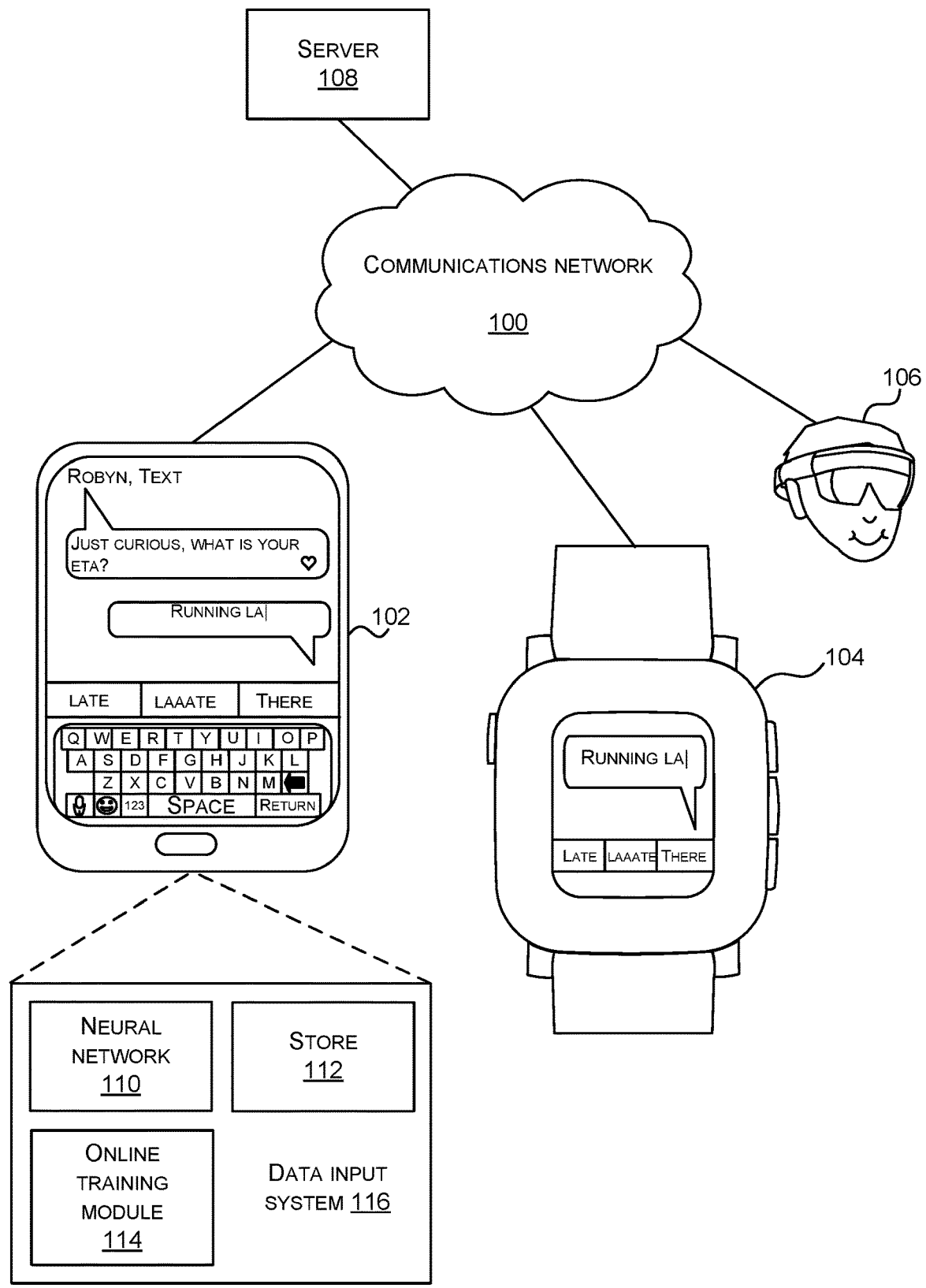
FIG. 1 is a schematic diagram of a plurality of electronic devices which have a data input system.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

In various examples described herein a neural network predictive text data input system is trained online to become bespoke to a particular user or group of users. Because a neural network is used the technology has ability to generalize and can perform well when text items learnt as bespoke to a user are input in contexts not previously encountered by the neural network.

Rather than carrying out full online training of the whole neural network, which is costly and impractical using resource constrained devices, the online training updates a vocabulary of text item embeddings of the neural network. In some examples, biases associated with the text item embeddings are also updated. This is achieved using heuristics and/or a shallow back propagation training algorithm which updates only part of the neural network rather than all layers of the neural network. In some cases the shallow back propagation is used to update the text item embeddings and, rather than the shallow back propagation also updating bias values associated with the embeddings, the bias values are updated using a heuristic in order to achieve efficiencies.

In order to save memory, the vocabulary of text item embeddings is stored using different lengths of text item embeddings. For example, by storing frequent text items using full length text item embeddings and storing less frequent text items using shorter length text item embeddings. The online training process is arranged in some examples so that it changes the length of a text item embedding, by making that longer when a text item learnt as bespoke to a user becomes more frequent, or by reducing a length of a text item embedding when a text item learnt as bespoke to a user is not observed over a given time. This enables a fine grained control of a trade-off between memory savings and quality of performance of the neural network.

As mentioned above, previous data input systems using predictive text neural network technology find it difficult to perform well in the case of user input text items which are not in a vocabulary of the neural network. The vocabulary of the neural network is typically limited, in resource constrained deployments, to one or more tens of thousands of text items due to memory restrictions. However, it is not essential to limit the vocabulary in this manner. No matter what the size of the vocabulary, there are always neologisms or peculiar spellings not found in the vocabulary that it is desired to learn a representation for but cannot be trained in advance.

This is a particular problem when the user enters rare words such as place names, or words which are idiosyncrasies of the user rather than words found in published dictionaries. For example, a user might repeat a letter of a word to express emphasis or emotion, such as "helloooo" rather than "hello" and, where the user prefers to use "helloooo" on a regular basis it becomes annoying when the predictive text neural network data input system repeatedly tries to correct the word to "hello". Because the word "helloooo" is not in a vocabulary of the predictive text neural network data input system the user is forced to type each individual letter of "helloooo" since no candidate for "helloooo" is offered by the predictive text neural network data input system.

A predictive text neural network data input systems may be able to offer a candidate which is the same as the user input item, such as "hellooo" but without including "helloooo" in the vocabulary of the neural network. Another option is to populate an N-gram language model using observations of user input from a particular user. However, in both these cases, there is no ability to generalize to context where the out of vocabulary word has not been encountered before. For example, if a user entered "he said" as context then the predictive text data input system is unlikely to offer "hellooo" as a candidate if "he said hellooo" has not been observed before.

An example is now described with reference to FIG. 1 in which a data input system has an online training module 114 which has been used to make the data input system at smart phone 102 bespoke to a particular user of that smart phone in a way which gives generalization.

FIG. 1 is a schematic diagram of a plurality of electronic devices 102, 104, 106 in communication with a server 108 over a communications network 100 such as the internet or any other communications network. The electronic devices 102, 104, 106 each have a data input system 116 comprising a neural network 110, a store 112 and an online training module 114. The data input system 116 has other components as described in more detail later with reference to FIG. 10 and omitted from FIG. 1 for clarity.

The neural network 110 predicts items in a sequence of items such as words, phrases, morphemes, characters or other units of language. The items can be images in some examples, such as emoji, emoticons, stickers or other images which are used as part of text. The neural network 110 has been trained in advance, for example, during a manufacturing stage or in an offline stage. The training takes place at a server 108 or any other entity and uses training data as explained in more detail later in this document. The trained neural network 110 is updated using an online training module 114 to become tailored to a particular user or group of users.

The data input system 116 has a store 112 holding a vocabulary of embeddings of text items and bias values associated with the embeddings. The store is part of the neural network 110 but is illustrated as a separate component in FIG. 1 to aid understanding of the technology. The store is described in more detail with reference to FIG. 3.

The electronic devices in FIG. 1 include a smart phone 102, a smart watch 104 and a head worn augmented-reality computing device 106 and these are examples only as other electronic devices may be used such as a desk top computer, tablet computer, laptop computer and others.

In the examples described herein the neural network 110 uses embeddings of text items. An embedding is a plurality of learnt weights representing a text item in a form that can be processed by units of a neural network. An embedding may be a real valued vector in some cases. In some examples, an embedding also comprises a scalar bias value which is stored as part of the real valued vector or which is stored separately. The learnt weights of an embedding are numerical values. The embeddings are used in at least two different stages of the data entry process and these may be referred to as a neural network input stage and a neural network output stage. At the neural network input stage, where a user inputs an item such as a word, phrase, morpheme, emoji, character or other context item into the electronic device the neural network is used to predict candidate next items in a sequence of the items. In order to input the item into the neural network it is mapped to an embedding which is then input to the neural network. Where the user inputs a sequence of items such as the words "I", "am", "a", "beautiful" then each of these individual words is mapped to a corresponding embedding and input to the neural network in order to predict candidate next words such as "person".

At the neural network output stage, an output layer of the neural network produces numerical values which are activation levels of units in the output layer of the network. These numerical values form a predicted embedding. In order to convert the predicted embedding into scores for individual candidate items (such as candidate words, phrases, morphemes, emoji or other items) a measure of similarity is computed between the predicted embedding and individual ones of a plurality of embeddings available to the scoring process. In some examples a dot product is computed as the measure of similarity but this is not essential as other measures of similarity may be used. The similarity measures give a plurality of scores, one for each of the embeddings, which when normalized express the likelihood that the next item in the sequence is each of the items corresponding to the embeddings. Where an embedding has an associated bias value, the bias value is aggregated with the score, for example by addition, multiplication or other forms of aggregation. In this way the score becomes biased in a manner taking into account the bias value. The bias values are manually configured, set to the log probability of the item under a unigram model (which may be computed from a training set of items), or learnt through backpropagation together with the embeddings.

In order that a neural network 110 at an electronic device 102, 104, 106 is able to operate to generate predictions, it uses embeddings for the neural network input and output stages mentioned above. The electronic device 102 has at least one store 112 which holds embeddings to facilitate the input and output stages. The store 112 may be shared between the input and output neural network stages. However, even despite this sharing, which avoids the need to have more than one embedding table (one for the input stage and one for the output stage) the embeddings take up memory at the electronic device and this memory is limited. The memory used by the embeddings, which are typically stored in a table with each row of the table being one embedding, is significant, in the case of resource constrained deployments, since a number of rows in the table may be ten thousand or more and the number of columns as many as 160 or more.

In order to reduce the amount of memory used by the store 112, various examples described herein use embeddings of different lengths. In an example, embeddings for items that appear with a low frequency in user input are given shorter embeddings than items that appear with high frequency in user input. This enables the amount of memory taken by the embeddings to be reduced. For example, rather than having all the rows in an embedding table having 160 columns, a first proportion of these have 80 columns, a second proportion have 40 columns and the remaining rows have 160 columns. However, this is an example only and other arrangements of different lengths of row in an embedding table are possible.

Quality or accuracy of the predictions made using the neural network is another factor to consider. Where the dimensionality of an embedding is lower (fewer columns in the row of the embedding table) the ability of the embedding to describe the corresponding text item is reduced. Thus by varying the length of item embeddings a trade off is controlled between the amount of memory taken by the embeddings and the ability of the embeddings to describe the items.

In the case that different lengths of embedding are used, the neural network 110 is able to project an embedding to make it longer or shorter. For example, as part of the neural network input stage, the neural network acts to project an embedding up to a specified length, suitable for input to the neural network. In the context of the neural network output stage, the neural network 110 acts to project a predicted embedding, output by the neural network, down to a shorter specified length, suitable for computing a score with embeddings in the table which have that shorter specified length. The projection is done by padding with zeros in some cases. The projection is done by linear interpolation in some cases which is achieved by multiplying the embedding with an adaptor matrix which has been learnt.

In the example of FIG. 1 a user of the smart phone 102 has received a text message which says "Just curious, what is your ETA?". The user of the smart phone 102 is composing a reply and has typed in "Running la" using a predictive virtual keyboard at the smart phone 102. An online training module 114 at the smart phone 102 has learnt that the user of the smart phone 102 often uses the word "laaate" to express that he or she is extremely late. The word "laaate" was not in the original store 112 of embeddings that was installed at the smart phone 102 during manufacture, or as a download from a provider since it is not a word typically observed in the English language. The online training module 114 has observed the user type in the word "laaate" in various different contexts and has learnt an embedding for "laaate" and added that to the store 112. As a result, the candidate text items computed by the neural network 110 in this example include "late", "laaate" and "there". In this way the burden of data input is reduced as the user is able to select the space bar, or select the candidate "laaate" and input that word using a single user action. The same situation is illustrated on smart watch 104 and is also possible using augmented-reality computing device 106.

FIG. 1 shows a server 108 connected to communications network 100 and which is used to provide all or part of the functionality of the neural network 110, store 112 and online training module 114. An electronic device is able to communicate with the server 108 to carry out all or part of the functionality of the neural network 110, store 112 and online training module 114.

Alternatively, or in addition, the functionality of the server and/or the electronic device described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
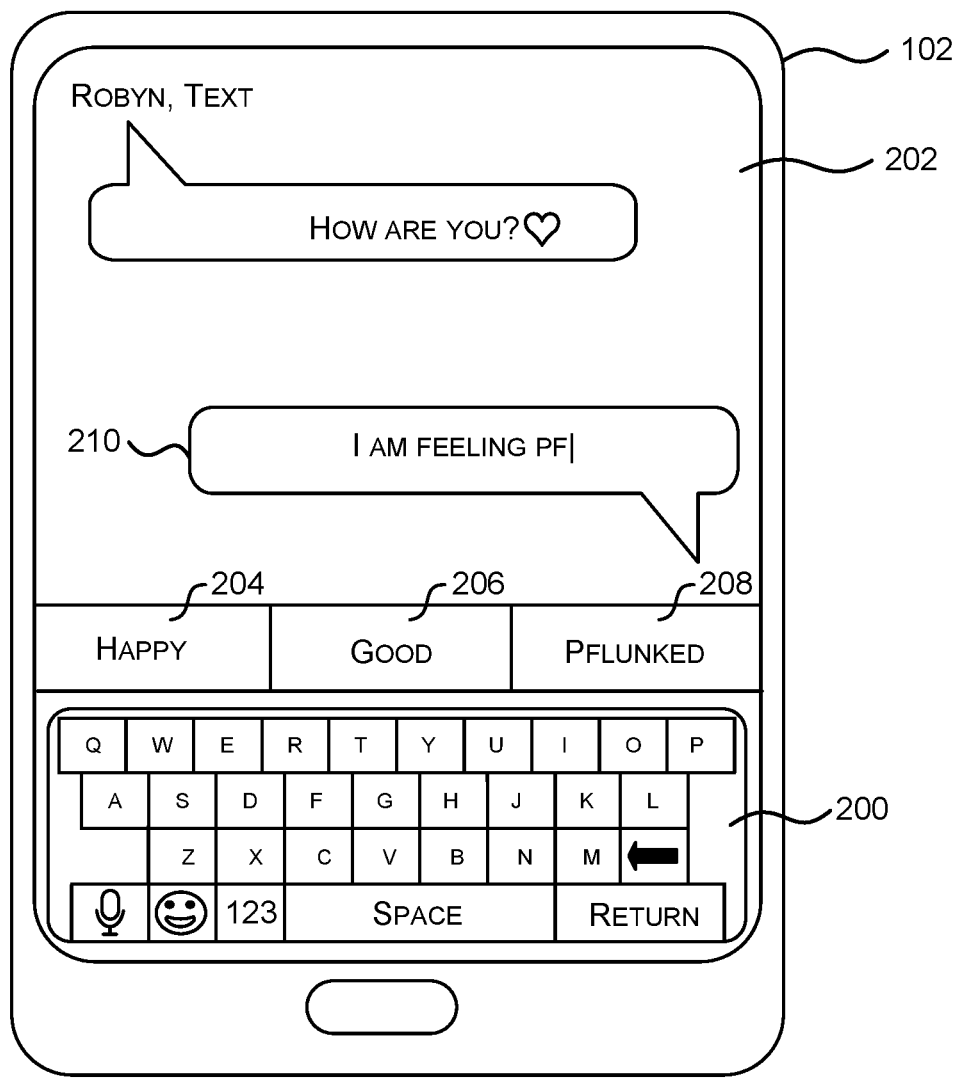
FIG. 2 is a schematic diagram of a smart phone with a predictive keyboard.

FIG. 2 is a schematic diagram of electronic device 102 in the case this device is a smart phone having a predictive keyboard that uses neural network technology. The smart phone has a display screen 202 such as a touch screen which displays a keyboard 200 for entering text to the electronic device 102. The keyboard 200 includes three candidate prediction regions 204, 206, 208 which display candidate predictions computed by the neural network technology. In this example, the user has received a short message service (SMS) message from Robyn which says "How are you?". The user is in the process of entering a reply SMS message in entry field 210 and so far has input the "I am feeling pf" and the predictive keyboard has computed three candidate predicted next words which are "happy", "good" and "pflunked" and these are displayed on the keyboard 200. The user is able to select one of the candidate predicted next words rather than entering the separate characters to form that word. This saves burden for the end user with regard to data entry. However, the quality of the predictions is important because if the candidate word is not the actual word the user intends to enter then the user has to enter the individual characters of the intended word. The quality of the predictions depends on various factors such as the amount and variety of training data used during training, the type of training used, the architecture of the neural network, the ability of the neural network to generalize to examples it has not seen during training, and other factors such as the available embeddings. The candidate predictions are updated in some examples, as the user enters individual characters of the intended word.

In the example of FIG. 2, an online training module has observed a user of the smart phone 102 enter the made up word "pflunked" on previous occasions and has learnt an embedding and bias for that made up word. As a result the candidate predictions include "pflunked" even though this is not a word in the English language and was not previously in a vocabulary of the neural network 110. The neural network 110 is able to predict "pflunked" as a candidate even though it has not observed "I am feeling pflunked" before.

Figure 3:
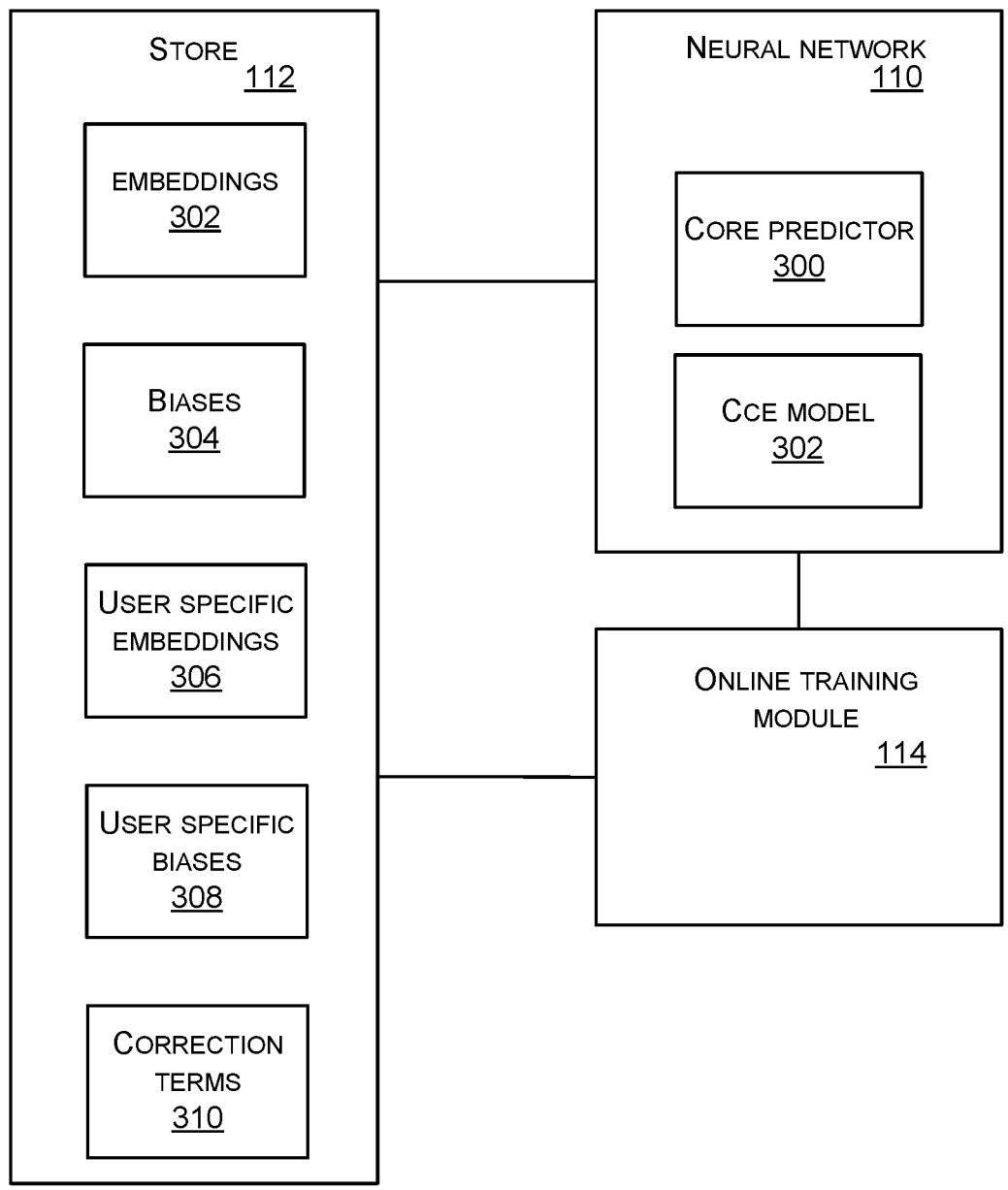
FIG. 3 is a schematic diagram of part of a data input system.

FIG. 3 is a schematic diagram of some of the components of the data input system 116 in more detail. The neural network 110 comprises a core predictor 300 which is described with reference to FIG. 4 and optionally a character compositional embedding model 302 which is a neural network that computes an embedding of a word given the individual characters of the word. The store 112, which strictly speaking is part of the neural network 110 but which is shown as a separate entity to aid understanding, comprises one or more tables 302, 306 of embeddings as well as bias values 304, 308 in some cases, and correction terms 310 in some cases. The embeddings together form a vocabulary of the neural network 110. The tables 302, 306 of embeddings have embeddings of different lengths in some cases as described above, in order to save memory. In some cases user specific data is separate so that it is easily identified and can be synchronized with other devices used by the same user. Thus user specific embeddings 306 are shown separately from embeddings 302 in FIG. 3 and user specific biases 308 are separate from biases 304. Where the online training module 114 learns correction terms for one or more embeddings 302 or biases 304, these are stored as correction terms 310. The user specific embeddings, biases and correction terms are synchronized with other devices of the user in some cases. The online training module 114 is able to evict data from store 112 according to rules and/or criteria such as frequency of observation of corresponding text items in user input, time periods and other criteria.

Figure 4:
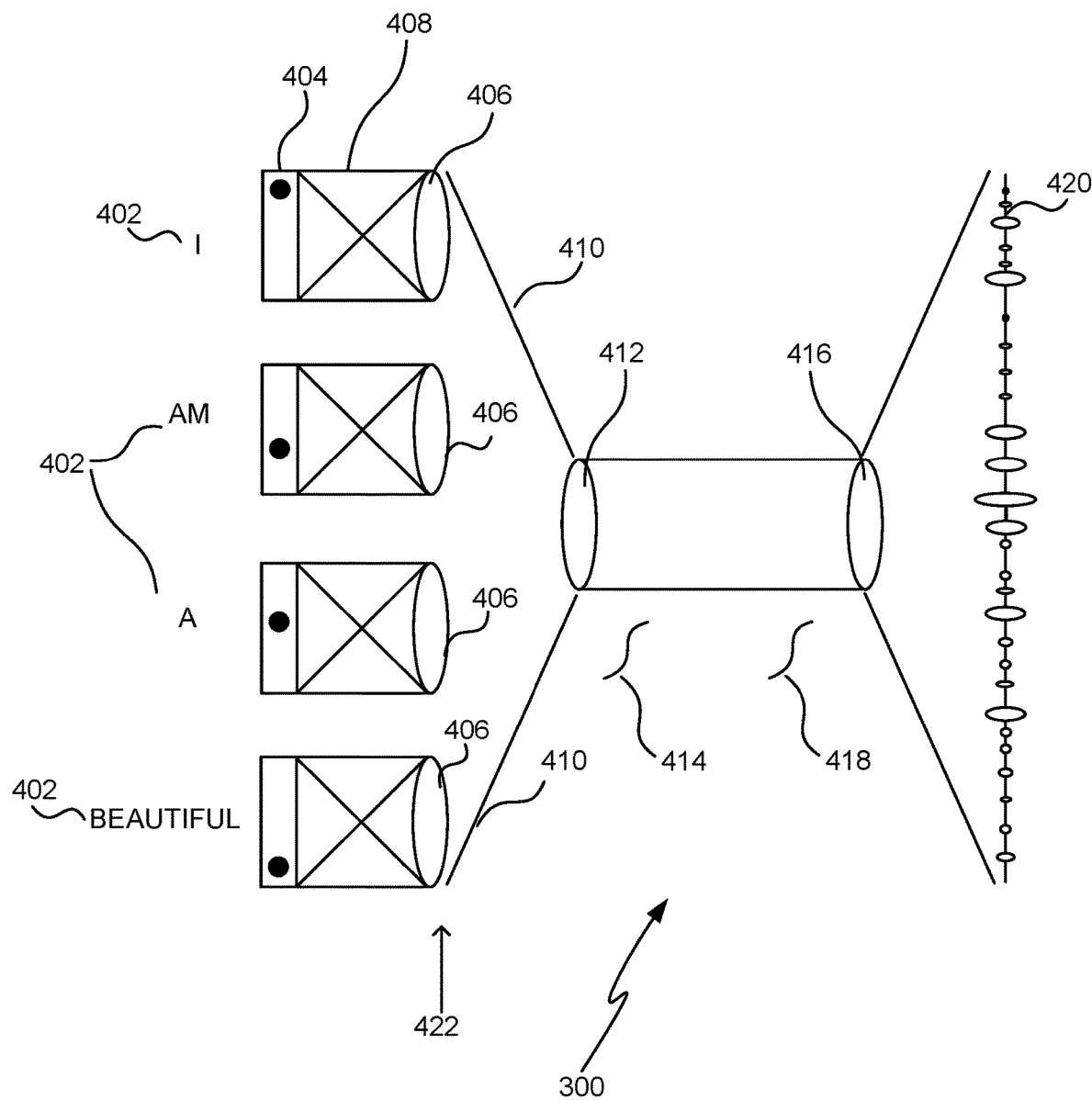
FIG. 4 is a schematic diagram of a neural network language model.

FIG. 4 is a schematic diagram of a neural network 300 such as the neural network 110 of FIG. 1.

A neural network is a collection of nodes (also referred to as units) interconnected by edges and where there are weights associated with the nodes and/or edges. A non-linear function is commonly applied in each node to produce its activation and a non-exhaustive list of non-linear functions which may be used is: sigmoid, tan h, rectifier. During a training phase the weights are updated according to update rules in the light of training examples. The units comprise input units, hidden units and output units. Input units are units at which input is made to the neural network, hidden units are connected between input units and output units (or other hidden units in the case of deep networks), and output units are units at which output from the neural network is observed. A neural network may have a layered construction with a layer of input nodes, one or more layers of hidden units and at least one output layer. During use of the neural network at test time (i.e. after training) as a signal passes through a layer it produces an output via the activations which becomes the input to the next layer of the neural network and so on, until the signal reaches the output layer and the output units are activated. The pattern of activations at the output layer gives the prediction of the neural network. The pattern of activations has been influenced by the weights learnt during the training phase.

The neural network 300 is trained using back propagation or any other neural network training algorithm. A back propagation algorithm comprises inputting a labeled training data instance to the neural network, propagating the training instance through the neural network (referred to as forward propagation) and observing the output. The training data instance is labeled and so the ground truth output of the neural network is known and the difference or error between the observed output and the ground truth output is found and provides information about a loss function. For example, the loss function is categorical cross entropy. A search is made to try find a minimum of the loss function which is a set of weights of the neural network that enable the output of the neural network to match the ground truth data. Searching the loss function is achieved using gradient descent or stochastic gradient descent or in other ways. Once a solution is found it is used to update the weights at the output layer. Information about a loss function is then available for the preceding layer and a solution of the loss function is found and used to update the weights of that preceding layer. This process repeats for each earlier layer of the neural network in turn and the processing in this stage is referred to as a backwards pass or backwards propagation.

In the example of FIG. 4 the neural network 300 comprises an input layer 422, a single hidden layer 412 and a single output layer 416. However, this is one example only and many other types of architecture may be used with more hidden layers for example, and with recurrent structures where connections between units form a directed cycle.

In the example of FIG. 4 a user has entered the words "I", "am", "a" and "beautiful" and each word is represented by the position of a 1 in a vector otherwise filled with zeros. These vectors are illustrated at 404 in FIG. 4. Each individual word indicator vector 404 is mapped to an embedding vector 406 by using a mapping 408. The embeddings are looked up from store 112. The embeddings 406 are input to input units of an input layer 422 and create activations which propagate forward through the input layer as indicated by lines 410 to reach hidden layer 412. The hidden layer receives the output of the input layer as its input. The hidden layer processes the signal according to activation functions represented as 414 in FIG. 4 and weights at the hidden layer units. The output of the hidden layer 412 reaches the output layer 416 which also processes the signal according to activation functions represented as 418 in FIG. 4 and generates activations represented as blobs on line 420 at the output units. The activations of the output units are converted to scores of items in a set of available item embeddings. This is done by taking a dot product (or other measure of similarity) between the predicted item embedding given by the activations of the output units and each of the available item embeddings and then, in the case that scalar bias values are available, adding a scalar bias value which has been stored for that item. The scores may be normalized so that they sum to one, for example by applying a softmax function or in other ways. If the available item embeddings are for the words "person", "being", "child", "house", "day" then the result is a score for each of "person", "being" "child" "house" and "day" which indicates how likely the word is to be the next word intended by the user.

Figure 5:
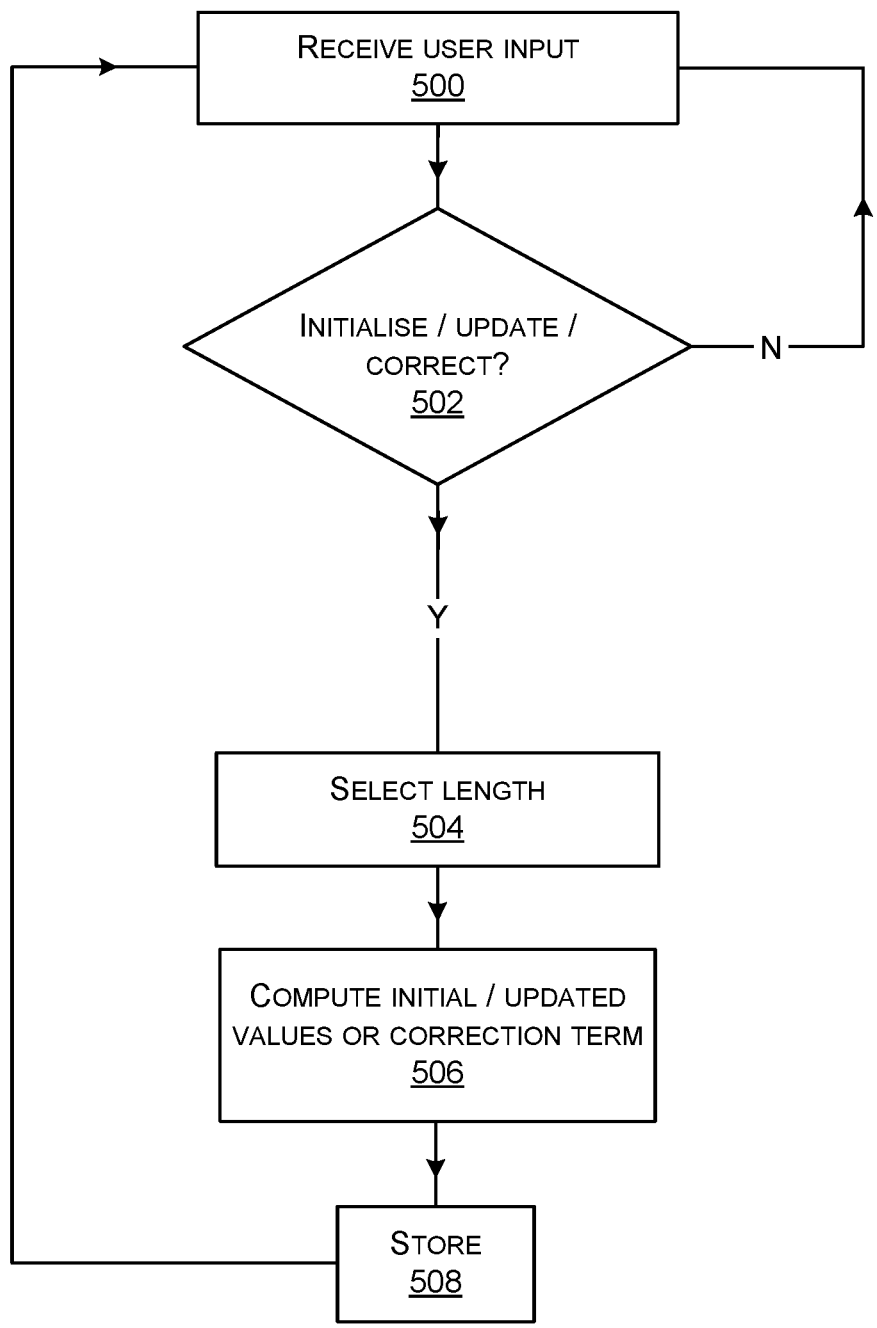
FIG. 5 is a flow diagram of a method at the online training module of FIG. 1.

FIG. 5 is a flow diagram of a method of operation at an online training module 114. The online training module 114 is either at an electronic device or is located at server 108. It receives 500 user input such as "I am feeling pf" using the FIG. 2 example. The user input is made via an input interface at an electronic device such as the smart phone 102, smart watch 104 or augmented reality computing device 106 and sent to the online training module. The input interface is any mechanism which enables a user to input data to an electronic device.

The online training module 114 decides 502 whether it should operate or not, to carry out online training with regard to the received user input. It takes into account several factors, such as what type of online training algorithm is to be used, and what data already exists, if any, in the store regarding the user input.

In some cases the online training algorithm is one which takes into account both positive and negative examples. In this case the online training module potentially decides at step 502 to operate for every user input which is received.

Suppose the online training module is trying to learn an embedding and bias value for a new word. A positive example is an instance of the new word in user input. A negative example is user input that does not contain the new word.

In some cases the online training algorithm is one which takes into account positive examples and which ignores negative examples. If a negative example is observed the step 502 returns to step 500. Where the online training algorithm takes into account positive examples but not negative examples, the decision at step 502 involves factors such as one or more of: checking if an embedding of the text item is available in the vocabulary, checking if an embedding of the text item was generated by a compositional character model, checking age of an embedding of the text item in the vocabulary, checking a number of times an embedding of the text item in the vocabulary has been updated. If there is no embedding of the text item available in the vocabulary at store 112 then the online training module proceeds on the yes branch of decision point 502 in FIG. 5 as the text item may be one likely to be used again by the user, such as "pflunked" or "laaate". If there is an embedding of the text item in store 112 but this was generated by CCE model 302, the quality of the embedding may be poor since it has not been learnt by a larger scale off-line learning process. The online training module is able to update the embedding generated by the CCE model 302 or to compute a correction term for that embedding. The online training module is able to check an age of an embedding in the store 112. If the user input 500 comprises an item with an embedding that has been learnt by the online training module and that is older than a threshold age the online learning module is able to select this embedding to be updated or to have a correction term computed. In this way the online training module enables the predictive keyboard to adapt to changes in a particular user's use of language over time, for example, as particular words or other text items move in and out of fashion. The online training module is able to check a number of times it has already updated an embedding of a text item. If this is above a threshold a decision may be taken not to make any further updates to the embedding. This enables resources to be saved.

When a decision is made at operation 502 to proceed along the yes branch as indicated in FIG. 5 the online training module selects 504 an embedding length. This is useful in the case where the store 112 stores embeddings of different lengths in order to save memory. If the online training module 504 is to initialize a new embedding that does not yet exist in the store 112 it selects a shorter embedding length. As the new embedding is updated over time using positive examples, the length is increased as more information is known about the item the embedding represents, and as the embedding is likely to be used again since there have been positive examples observed. In this way the online training module provides fine grained dynamic control of a trade off between memory used by store 112 and quality of predictions made by the neural network 110.

Using the selected length, the online training module proceeds to do one or more of: compute initial values of embeddings and/or biases, compute updated values of embeddings and/or biases, and to compute correction terms to be applied to embeddings.

Figure 6:
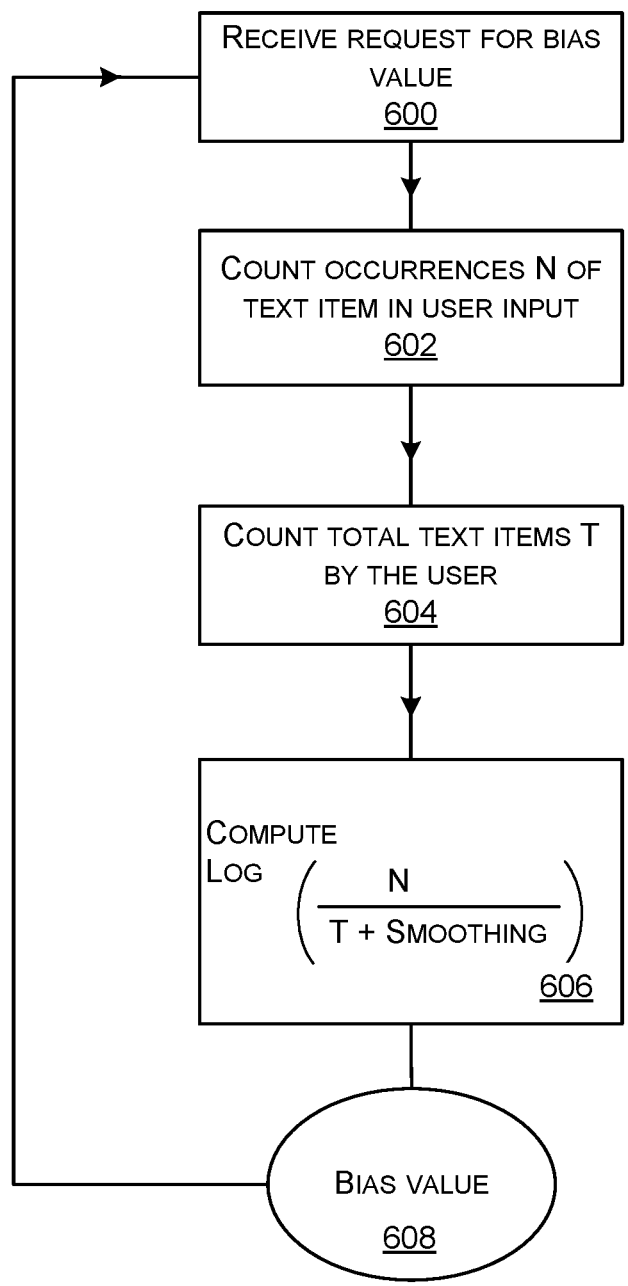
FIG. 6 is a flow diagram of a method of computing a bias, this method used as part of the method of FIG. 5.

FIG. 6 is a flow diagram of a method at the online training module 114 of computing an initial bias value for an embedding of a text item and updating that bias value. This method is used by the online training module either "on the fly" or as a background process. The online training module 114 receives a request for a particular bias value from the neural network 110. For example, in the "on the fly" mode, the neural network 110 sends the request as and when it needs the bias value during the scoring process at the neural network output stage 110. In the background mode, the online training module 114 requests itself to generate or update a bias value associated with an embedding whenever there is an event associated with that embedding at the online training module 114. The events include initialization of an embedding, update of an embedding, computing a correction term for an embedding.

The online training module counts 602 a number of occurrences N of the text item associated with the bias value which have been observed in input from the user. The online training module counts 604 a total number of text items T which has been input by the user. The online training module computes 606 a logarithm of the number of occurrences N of the text item, divided by the total T plus a smoothing constant. The smoothing constant is set by an operator on the basis of empirical data. The result of the computation at step 606 is a bias value 608 which is stored at store 112 and/or used by the neural network 110 for scoring. The process returns to step 600.

Figure 7:
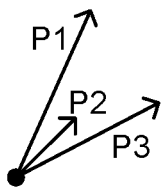
FIG. 7 is a schematic diagram of predicted embedding vectors.

FIG. 7 is a schematic diagram of three predicted embeddings p1, p2, p3 which are depicted as vectors from an origin in an embedding space. The vectors have lengths indicated by the lengths of the arrows, and have directions as indicated by the arrows in FIG. 7. Suppose that p1 is the predicted embedding computed by the neural network 110 when the user input was "he was", p2 is the predicted embedding computed by the neural network when the user input was "are you" and p3 is the predicted embedding computed by the neural network when the user input was "the whole job was". In each case the user subsequently typed in "pflunked" which is a made up word not initially in the vocabulary of the neural network 110 so that the user either has to type in the individual letters of "pflunked". The inventors have recognized that the directions of the predicted embedding vectors are likely to be similar since the input would often result in a similar set of predicted words in each case. Therefore a method of computing an embedding for "pflunked" comprises computing an embedding which has a direction related to the directions of the predicted embeddings p1, p2 and p3. In order to find a size, such as a norm, for the embedding for "pflunked" statistics of the embeddings in the vocabulary are used, such as an average norm of an embedding in the vocabulary, or a mean or median norm or other statistic. In some cases the norm is an L2 norm which is computed as the root-mean-square of values in the vector. An example is now described with reference to FIG. 8.

Figure 8:
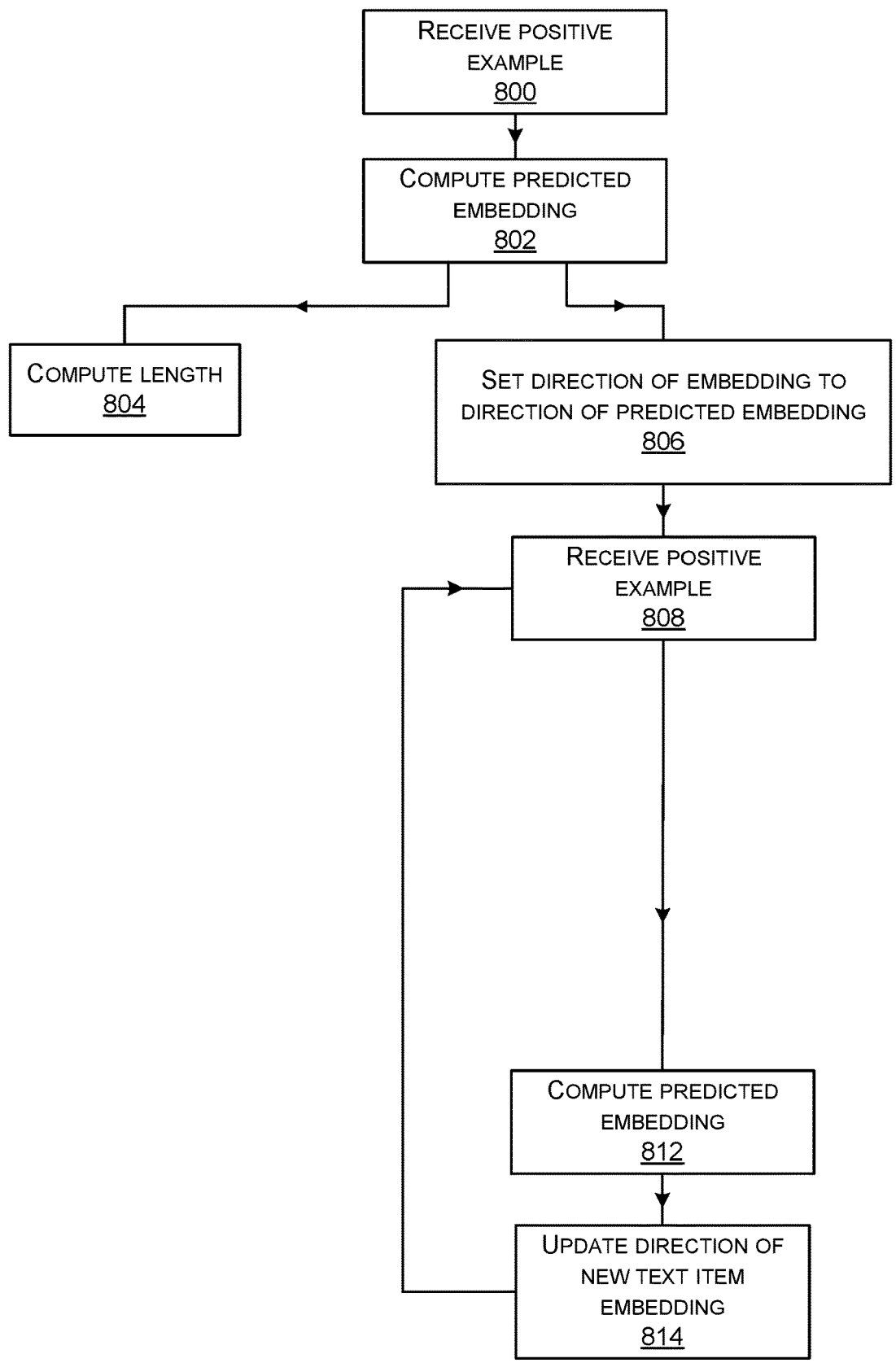
FIG. 8 is a flow diagram of a method of computing an embedding, this method being part of the method of FIG. 6.

The method of FIG. 8 is carried out by the online training module 114. When the online training module has decided to compute or update an embedding of a text item, by ignoring negative examples, it is able to use the method of FIG. 8. The online training module 114 has received 800 a positive example such as "he was pflunked" from FIG. 7. Using neural network 110 it computes 802 a predicted embedding given the context, such as "he was" in the present case. The online training module computes 804 a length for an embedding of "pflunked". For example, it finds an average length of embeddings of text items in the store 112, or an average length of embeddings of text items in the user specific part of the store 112. The online training module sets 806 a direction of the embedding of "pflunked" to be the same as the direction of the predicted embedding. The online training module receives 808 another positive example such as "are you pflunked". It uses neural network 110 to compute 812 a predicted embedding given context "are you". The online training module updates the direction of the embedding of "pflunked" to take into account the direction of the predicted embedding computed at step 812. The update comprises aggregating the directions, such as by averaging, computing a moving average, or other aggregation methods.

Figure 9:
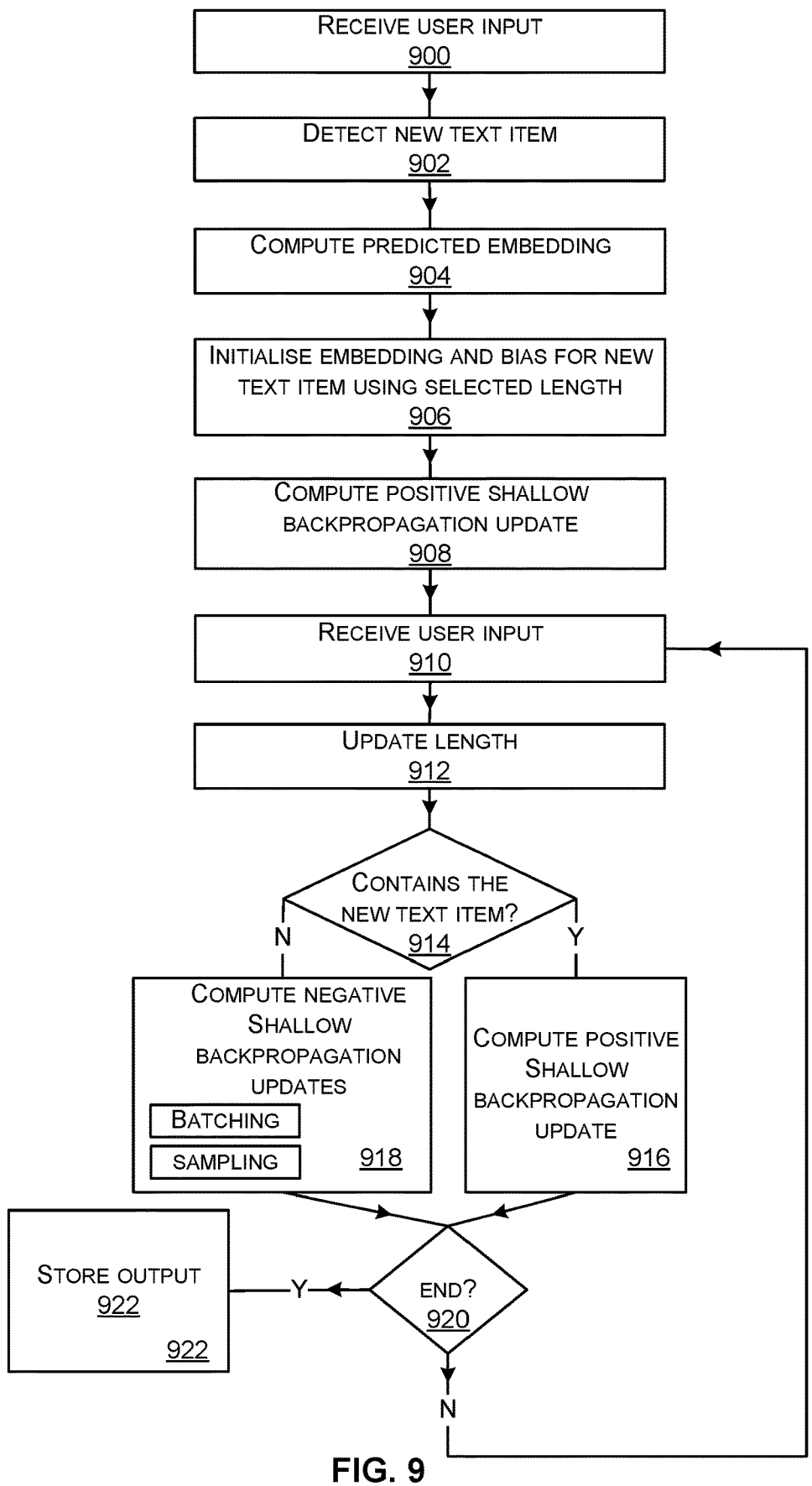
FIG. 9 is a flow diagram of a method of computing an embedding using shallow backpropagation, this method being part of the method of FIG. 6.

FIG. 9 is an example of a method at the online training module 114 in the case that both positive and negative examples are to be used. In this case a shallow backpropagation process is used. A shallow backpropagation process is a neural network training algorithm which is the same as any form of neural network backpropagation but limited to updating the parameters at the output layer. That is, rather than updating parameters at all layers of the neural network during the backwards pass, only parameters at the output layer are updated. These parameters at the output layer include the embeddings in the vocabulary and the biases. The process of FIG. 9 is an example of a shallow backpropagation process which updates the embeddings in the vocabulary and optionally updates the biases. That is, the bias values are not affected by the process of FIG. 9 in some cases. The inventors have recognized that it is possible to remove update of the bias values from the backpropagation process and instead use the process of FIG. 6 to compute the bias values so as to achieve efficiencies without detrimenting quality of the neural network predictions.

The online training module 114 receives 900 user input such as "he was pflunked" and detects 902 a new text item "pflunked" which is not present in the vocabulary at store 112. It computes 904 a predicted embedding by inputting embeddings of "he" and "was" into neural network 110. The online training module selects a length for a new embedding for "pflunked" (see FIG. 5, 504) and initializes the new embedding for "pflunked". The initialization is done by computing a scale as described above and using the scale as the embedding length. The initialization is done by computing an embedding using the CCE model 302 in some cases. The initialization is done by using a default or randomly selected embedding in some cases. It is recognized herein that random initialization is not essential to break symmetry in order to train the network parameters, as the existing portion of the network and training observations can already break symmetry in the new parameters. Therefore in some cases the initialization is done by setting the embedding values to zero. The online training module 114 computes 908 a positive shallow backpropagation update. This is done by comparing the predicted embedding and the initialized embedding to find information about a loss function. The loss function is searched as described above and a solution is found. Gradient descent with the well known Adagrad algorithm is used in some examples to search the loss function although other gradient descent algorithms can be used. The solution is used to update the parameters of the output layer of the neural network 110 including the embedding for "pflunked" and optionally the associated bias value.

As further user input is received 910 the online training module 114 proceeds to carry out either positive or negative shallow backpropagation updates. The online training module 114 selects 912 a length for the embedding being updated. The online training module can continue with the length used at step 906 or select a new length. For example, the length is increased if the length is currently below a maximum length and if the number of positive shallow back propagation updates has been above a threshold. The online training module 114 checks 914 if the user input contains the new text item "pflunked" for which an embedding is being updated. If so it computes a positive shallow backpropagation update at operation 916 in the same way as at operation 908. If the user input does not contain the new text item "pflunked" the process moves to operation 918. Suppose the user input is "he was happy". The word "pflunked" is not present and so the process moves to box 918. At process 918 a negative shallow backpropagation update is carried out, taking into account any batching and/or sampling which is being used. The negative shallow backpropragtion update is computed by computing a predicted embedding given context words "he was", comparing the difference between the predicted embedding and the current embedding for "pflunked" and using the difference as evidence about a loss function. The loss function is searched to find a solution which is used to make a negative update to the parameters of the output layer of the neural network 110. In order to give efficiency the negative updates are batched up, accumulated to save memory, and flushed through periodically after a certain number of negative examples or when the next positive example is observed. In some cases sampling is used to reduce the number of negative shallow backpropagation updates at process 918. In the case of sampling, each negative update is performed randomly with a probability specified by a noise distribution. In some examples, the sampled negative update is increased in magnitude, for example according to the update equations of the well known noise contrastive estimation algorithm.

An efficient negative update for multiple embeddings may be computed by sampling contexts randomly. If a context is selected for negative update, the predicted embedding is stored in a buffer. The probabilities of items that have learnt embeddings or correction terms are also stored in a buffer. After the buffers reach a specified size limit, the negative update is computed using the buffers and applied to the embeddings, and the buffers are cleared.

The online training module 114 decides whether to stop updating the embedding for "pflunked" at check point 920 such as by checking for convergence (little change in the embedding for subsequent updates) or by checking that a fixed number of updates have occurred. If the process is to end the output is stored 922 either by replacing the embedding in the store 112 with a new version of that embedding, by creating a new embedding in store 112, or by storing a correction term.

Figure 10:
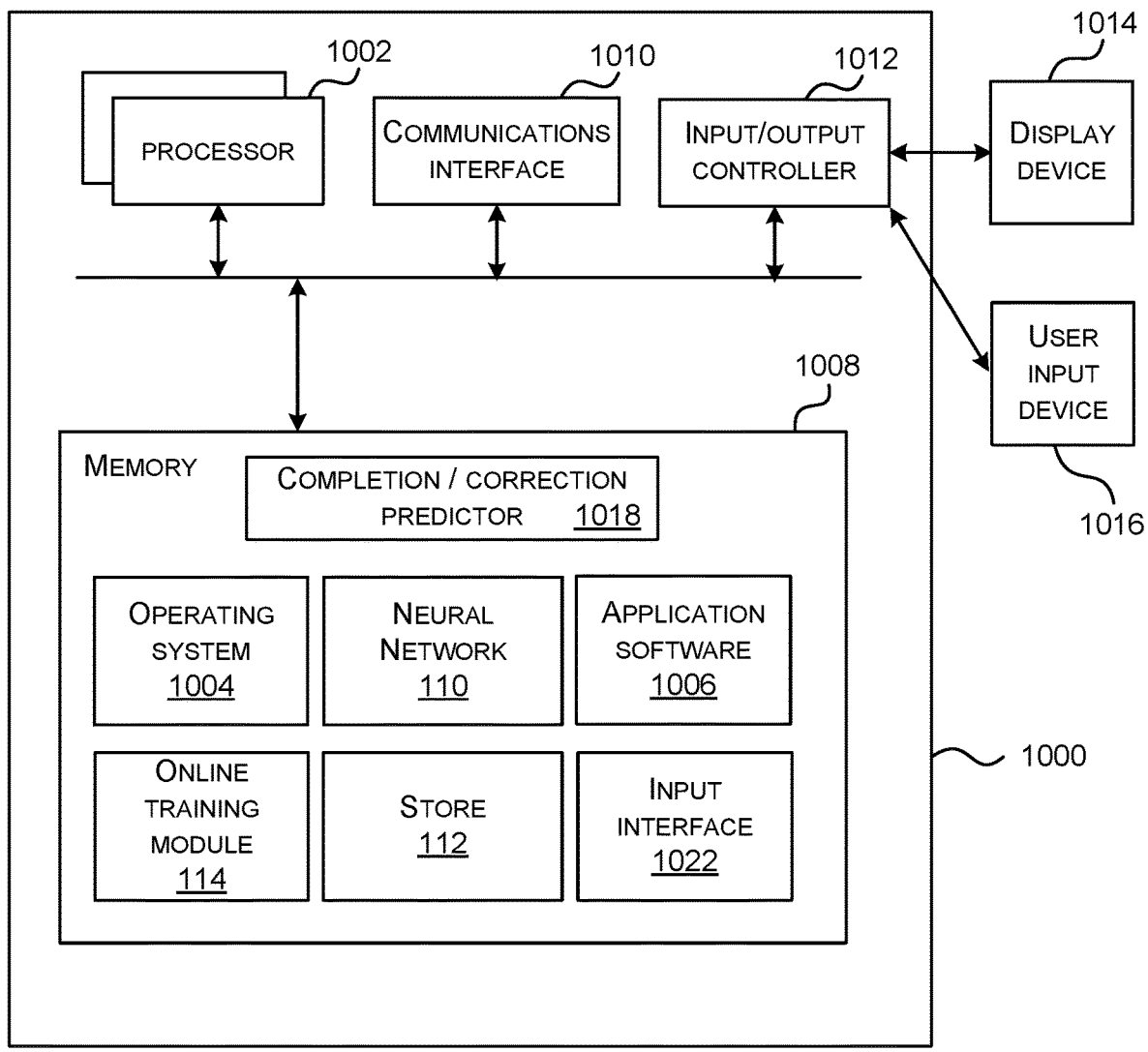
FIG. 10 illustrates an exemplary computing-based device in which embodiments of a data input system are implemented.

FIG. 10 illustrates various components of an exemplary computing-based device 1000 which are implemented as any form of electronic device in which embodiments of the methods of FIGS. 5 to 9 are implemented in some examples and which provides the data input system 116 of FIG. 1.

Computing-based device 1000 comprises one or more processors 1002 which are microprocessors, controllers or any other suitable type of processors for processing computer executable instructions to control the operation of the device in order to predict candidate items in a sequence of items to facilitate entry of the items into the electronic device 1000. In some examples, for example where a system on a chip architecture is used, the processors 1002 include one or more fixed function blocks (also referred to as accelerators) which implement a part of the method of FIGS. 5 to 9 in hardware (rather than software or firmware). Platform software comprising an operating system 1004 or any other suitable platform software is provided at the computing-based device 1000 to enable application software 1006 to be executed on the device. A neural network language model 110 is stored at the electronic device. An input interface 1022 receives items in a sequence of items to enable a user to input the item to the electronic device 1000. A store 112 comprises a plurality of embeddings and associated bias values of the neural network and in some cases stores a plurality of different lengths of embedding. Completion/correction predictor 1018 uses output from the neural network 110 to complete words, phrases, emoji or other items. For example, the completion/correction predictor 1018 is a predictive keyboard or a predictive speech recognition system. Online training module 114 is able to update/create/delete data in store 112 in the light of user input observed at input interface 1022 so that neural network 110 is able to make predictions personalized to a user of the computing-based device 1000.

The computer executable instructions are provided using any computer-readable media that is accessible by computing based device 1000. Computer-readable media includes, for example, computer storage media such as memory 1008 and communications media. Computer storage media, such as memory 1008, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1008) is shown within the computing-based device 1000 it will be appreciated that the storage is, in some examples, distributed or located remotely and accessed via a network or other communication link (e.g. using communication interface 1010).

The computing-based device 1000 also comprises an input/output controller 1012 arranged to output display information to a display device 1014 which may be separate from or integral to the computing-based device 1000. The display information may provide a graphical user interface. The input/output controller 1012 is also arranged to receive and process input from one or more devices, such as a user input device 1016 (e.g. a mouse, keyboard, camera, microphone or other sensor). In some examples the user input device 1016 detects voice input, user gestures or other user actions and provides a natural user interface (NUI). This user input may be used to input data to the electronic device. In an embodiment the display device 1014 also acts as the user input device 1016 if it is a touch sensitive display device. The input/output controller 1012 outputs data to devices other than the display device in some examples, e.g. a locally connected printing device.

Any of the input/output controller 1012, display device 1014 and the user input device 1016 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

A data input system at an electronic device for inputting text items to the electronic device, comprising:

a store holding a vocabulary of embeddings of text items, each embedding being a numerical encoding of a text item;

a processor which receives user input comprising a sequence of one or more context text items and a new text item, the new text item being a text item with an embedding to be computed and added to the vocabulary or with an embedding already in the vocabulary and to be updated;

a neural network predictor trained to predict the new text item by predicting a next text item in the sequence given the context text items and the vocabulary;

an online training module configured to update the vocabulary by using either a direction associated with the predicted next item, or, by comparing the new text item and the predicted next text item and propagating results of the comparison to a final layer of the neural network.

The data input system described above wherein the online training module is configured to determine whether a text item in the user input is a new text item by any one or more of: checking if an embedding of the text item is available in the vocabulary, checking if an embedding of the text item was generated by a compositional character model, checking age of an embedding of the text item in the vocabulary, checking a number of times an embedding of the text item in the vocabulary has been updated.

The data input system described above wherein the online training module is configured to update the vocabulary by selecting one of a plurality of possible lengths of an embedding associated with the new text item.

The data input system described above wherein the online training module is configured to update the vocabulary by using a direction associated with the predicted next item by setting a direction of an embedding of the new text item in relation to the direction of an embedding of the predicted next item.

The data input system described above wherein the processor is configured to receive a plurality of instances of the new text item in user input and to compute a plurality of associated predicted embeddings, and wherein the online training module is configured to set the direction of the embedding of the new text item using an aggregation of the directions of the predicted embeddings.

The data input system described above wherein the online training module is configured to set a norm of the embedding of the new text item using one or more statistics of the vocabulary.

The data input system described above wherein the online training module is configured to compare the new text item and the predicted next text item and propagate results of the comparison to a final layer of the neural network.

The data input system described above wherein the online training module is configured to compare the new text item and the predicted next text item and propagate results of the comparison to a final layer of the neural network; the processor configured to receive further user input comprising positive examples of the new text item and negative examples of the new text item, and wherein the online training module is configured to update the vocabulary using both the positive and negative examples.

The data input system described above wherein the online training module is configured to update the embeddings and/or biases of the embeddings using both the positive and negative examples.

The data input system described above wherein the online training module is configured to sample and/or batch the negative examples of the new text item.

The data input system described above wherein the online training module is configured to change a number of elements of an embedding of the new text item.

The data input system of described above wherein the online training module is configured to compare the new text item and the predicted next text item and propagate results of the comparison to a final layer of the neural network, and wherein the online training module is configured to compute a bias of the new text item embedding by counting occurrences of the new text item and a total number of text items observed in user input at the electronic device.

The data input system described above wherein the online training module is configured to compute a bias of the new text item embedding by counting occurrences of the new text item and a total number of text items observed in user input at the electronic device.

The data input system described above wherein the online training module is configured to initialize an embedding of the new text item using an embedding computed by a character compositional embedding model.

The data input system described above wherein the neural network is configured such that, when additional user input is received comprising the new text item, the neural network computes the predicted next item using the updated vocabulary; and wherein the processor is configured to offer the predicted next item as data for input to the electronic device.

A computer-implemented method at an electronic device, the method comprising:
  storing, at a memory, a vocabulary of embeddings of text items, each embedding being a numerical encoding of a text item;
  receiving user input comprising a sequence of one or more context text items and a new text item, the new text item being a text item with an embedding to be computed and added to the vocabulary or with an embedding already in the vocabulary and to be updated;
  using a trained neural network to predict the new text item by predicting a next text item in the sequence given the context text items and the vocabulary;
  updating the vocabulary by using either a direction associated with the predicted next item, or, by comparing the new text item and the predicted next text item and propagating results of the comparison to a final layer of the neural network.

The method described above wherein the vocabulary is updated online at the electronic device.

The method described above comprising determining whether a text item in the user input is a new text item by any one or more of: checking if an embedding of the text item is available in the vocabulary, checking if an embedding of the text item was generated by a compositional character model, checking age of an embedding of the text item in the vocabulary, checking a number of times an embedding of the text item in the vocabulary has been updated.

The method described above comprising updating the vocabulary by using a direction associated with the predicted next item by setting a direction of an embedding of the new text item in relation to the direction of an embedding of the predicted next item.

One or more device-readable media with device-executable instructions that, when executed by a computing system, direct the computing system to perform operations comprising:
  storing a vocabulary of embeddings of text items, each embedding being a numerical encoding of a text item;
  receiving user input comprising a sequence of one or more context text items and a new text item, the new text item being a text item with an embedding to be computed and added to the vocabulary or with an embedding already in the vocabulary and to be updated;
  using a trained neural network to predict the new text item by predicting a next text item in the sequence given the context text items and the vocabulary;
  updating the vocabulary by using either a direction associated with the predicted next item, or, by using the new text item and the predicted text item in a shallow backpropagation process.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A data input system at an electronic device for inputting text items to the electronic device, comprising:
   a store holding a vocabulary of embeddings of text items, each embedding being a numerical encoding of a text item that indicates weights for analysis of the text item in a neural network;
   a processor which:
   receives user input comprising one or more context text items followed by a new text item that is a user-entered word, the user-entered word including one or more rare words, proper nouns, idiosyncrasies, or combinations thereof, the user-entered word being entered via individual letters and not initially being in the vocabulary of the neural network, and wherein the user-entered word does not exist in the store;
   determines, based on the user-entered word, whether to carry out an online training;
   computes, when determined to carry out the online training, one of:
   an embedding to be added to the vocabulary as a sequence of the one or more context text items followed by the new text item, or
   an update to an embedding already in the vocabulary for the sequence of the one or more context text items followed by the new text item;
   implements the neural network, the neural network trained to produce a prediction of a next text item in the sequence given the context text items and the vocabulary;
   implements online training to change the vocabulary by comparing the new text item and the predicted next text item; and
   propagates results of the comparison to a final layer of the neural network.

2. The data input system of claim 1 wherein the online training is configured to determine whether a text item in the user input is a new text item by any one or more of: checking if an embedding of the text item is available in the vocabulary, checking if an embedding of the text item was generated by a compositional character model, checking age of an embedding of the text item in the vocabulary, or checking a number of times an embedding of the text item in the vocabulary has been updated.

3. The data input system of claim 1 wherein the online training is configured to change the vocabulary by selecting one of a plurality of possible lengths of an embedding associated with the new text item.

4. The data input system of claim 1 wherein the processor is configured to receive a plurality of instances of the new text item in user input and to compute a plurality of associated predicted embeddings.

5. The data input system of claim 1 wherein the online training is configured to set a norm of the embedding of the new text item using one or more statistics of the vocabulary.

6. The data input system of claim 1 wherein the online training is configured to compare the new text item and the predicted next text item and propagate results of the comparison to a final layer of the neural network.

7. The data input system of claim 1 wherein the online training is configured to compare the new text item and the predicted next text item and propagate results of the comparison to a final layer of the neural network; the processor configured to receive further user input comprising positive examples of the new text item and negative examples of the new text item, and wherein the online training is configured to update the vocabulary using both the positive and negative examples.

8. The data input system of claim 7 wherein the online training is configured to update the embeddings and/or biases of the embeddings using both the positive and negative examples.

9. The data input system of claim 7 wherein the online training is configured to sample and/or batch the negative examples of the new text item.

10. The data input system of claim 1 wherein the online training is configured to change a number of elements of an embedding of the new text item.

11. The data input system of claim 1 wherein the online training is configured to compare the new text item and the predicted next text item and propagate results of the comparison to a final layer of the neural network, and wherein the online training is configured to compute a bias of the new text item embedding by counting occurrences of the new text item and a total number of text items observed in user input at the electronic device.

12. The data input system of claim 1 wherein the online training is configured to compute a bias of the new text item embedding by counting occurrences of the new text item and a total number of text items observed in user input at the electronic device.

13. The data input system of claim 1 wherein the online training is configured to initialize an embedding of the new text item using an embedding computed by a character compositional embedding model.

14. The data input system of claim 1 wherein the neural network is configured such that, when additional user input is received comprising the new text item, the neural network computes the predicted next item using the changed vocabulary; and wherein the processor is configured to offer the predicted next item as data for input to the electronic device.

15. A computer-implemented method at an electronic device, the method comprising:
   storing, at a memory, a vocabulary of embeddings of text items, each embedding being a numerical encoding of a text item that indicates weights for analysis of the text item in a neural network;
   receiving user input comprising one or more context text items and followed by a new text item that is a user-entered word, the user-entered word being entered via individual letters and not initially being in the vocabulary of the neural network, the user-entered word including one or more rare words, proper nouns, idiosyncrasies, or combinations thereof, and wherein the user-entered word does not exist in the memory;
   determining, based on the user-entered word, whether to carry out an online training:
   computing, when determined to carry out the online training, one of:
   an embedding to be added to the vocabulary for a sequence of the context text items followed by the new text item, or
   an update to an embedding already in the vocabulary for a sequence of the one or more context text items followed by the new text item;
   implementing a trained neural network to produce a prediction of a next text item in the sequence given the context text items and the vocabulary;
   implementing an online training to change the vocabulary by comparing the new text item and the predicted next text item; and
   propagating results of the comparison to a final layer of the neural network.

16. The method of claim 15 wherein the vocabulary is changed online at the electronic device.

17. The method of claim 15 comprising determining whether a text item in the user input is a new text item by any one or more of: checking if an embedding of the text item is available in the vocabulary, checking if an embedding of the text item was generated by a compositional character model, checking age of an embedding of the text item in the vocabulary, checking a number of times an embedding of the text item in the vocabulary has been changed.

18. The method of claim 15 comprising changing the vocabulary by comparing the new text item and the predicted next text item.

19. One or more device-readable media with device-executable instructions that, when executed by a computing system, direct the computing system to perform operations comprising:
   storing a vocabulary of embeddings of text items in a store, each embedding being a numerical encoding of a text item that indicates weights for analysis of the text item in a neural network;
   receiving user input comprising one or more context text items and followed by a new text item that is a user-entered word, the user-entered word including one or more rare words, proper nouns, idiosyncrasies, or combinations thereof, the user-entered word being entered via individual letters and not initially being in the vocabulary of the neural network, and wherein the user-entered word does not exist in the database;
   determining, based on the user-entered word, whether to carry out an online training;
   computing, when determined to carry out the online training, one of:
   an embedding to be added to the vocabulary as a sequence of the one or more context text items followed by the new text item, or
   an embedding already in the vocabulary for the sequence of the one or more context text items followed by the new text item;
   implementing a trained neural network to produce a prediction of a next text item in the sequence given the context text items and the vocabulary;
   implementing an online training to change the vocabulary by using the new text item and the predicted text item in a shallow backpropagation process.

* * * * *